Figure 1:
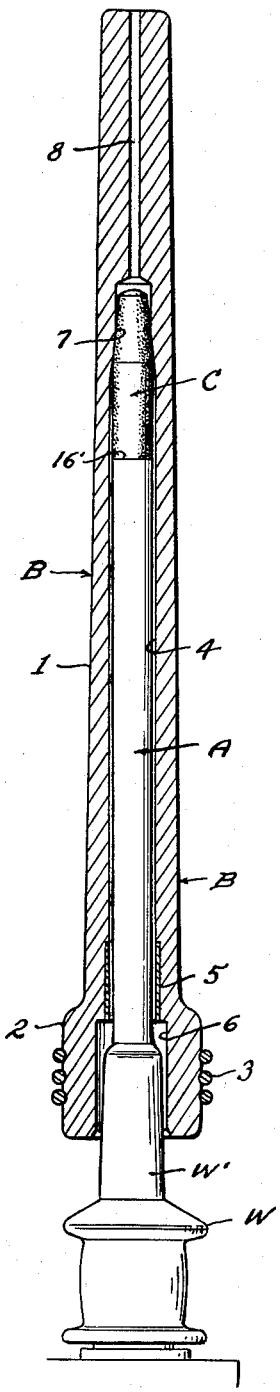

Jan. 26, 1960 C. R. SACCHINI 2,922,274
TEXTILE SPINDLES, PARTICULARLY FOR TOP
DRIVING OF FILLING QUILLS
Filed Nov. 13, 1957

INVENTOR.
C. R. SACCHINI
BY George M. Soule
ATTORNEY

United States Patent Office 2,922,274
Patented Jan. 26, 1960

2,922,274

TEXTILE SPINDLES, PARTICULARLY FOR TOP DRIVING OF FILLING QUILLS

Columbus R. Sacchini, Willoughby, Ohio, assignor to Curtiss-Wright Corporation, a corporation of Delaware Application November 13, 1957, Serial No. 696,270

5 Claims. (Cl. 57—130)

The invention relates to an improved high speed textile spindle adapted especially for "top drive" of light weight bobbins or quills of the type used for filling thread or yarn. The most common material used in making the tubular bodies or principal portions of filling quills is rock maple because of its relatively light weight, as compared to metal, its toughness and stability and fairly high resistance to fluid treatment necessary to the processing of the yarn stock to be carried on the quills. Because wood cannot be as precisely formed as can metal, the quills are apt to have considerable built-in unbalance. Even when precisely formed, absorbtion of moisture can warp the quills. Unbalance from any cause is accentuated as the yarn is wound onto the quills to form the packages for subsequent treatment of the yarn and for weaving. As spindle speeds have been increased over the years (between 10,000 and 12,000 r.p.m. at present) top driving of the quills has become common, which is to say the driving contact between spindle and quill has become confined to a tapered upper end surface of the spindle and a suitable internal seat surface within the quill generally near its upper end. The internal seat usually constitutes a relatively low degree taper generally conforming that of the spindle tip (e.g. .150 inch per inch), but sometimes the internal seat is an annular shoulder designed for approximate "line" contact with the tapered tip of the spindle. The approximate "line" contact of the quill seat with a tapered steel spindle tip makes the quill easier to doff than when the quill and spindle tip have relatively low degree mating conical surfaces of considerable length (referred to as "conforming fit"), but then there is less driving frictional contact such as is necessary to cause rotation of the quill and package at or near the speed of the spindle.

The high operational speed, assuming some unbalance or improper placement of nearly balanced quills on the spindles, causes high frequency vibrations of the quills and packages. Commonly, the result of even a very small amount of vibration, regardless of the type of seating the quill has on the spindle or of how effectively the quill is donned, is for the quill to rise or climb upwardly on the spindle, breaking whatever top driving contact has been established. The vibration (e.g. as soon as the initial driving contact has been broken), causes the steel driving tip of the spindle to become prematurely worn by the wood or other relatively soft material constituting the seating surface portion of the quill.

The present invention, broadly, is to replace the usual tapered steel seating surface of the spindle with a yieldable elastic tip surface portion on the spindle blade such as can conform to various seat surface configurations in the bores of commercially available quills sufficiently to provide effectual friction driving for the quills despite irregularities in the quill seating surfaces and a reasonable amount of built-in or acquired unbalance on part of the quills. The improved spindle tip is preferably a tough moulded rubber or elastomer cap for the spindle blade of such design that the cap will snugly interlock elastically, hence removably, with one or more annular ridge formations on an upper end or spud portion of a spindle blade of reduced cross section as compared to conventional forms of filling spindle blade top portions so that quill driving surface portions of the spindle cap will be of conventional or suitable form and size for cooperation with variously shaped quill seating surfaces. The reduced diameter or spud portion of the blade preferably supports the elastic cap by intimate contact therewith for nearly the full length of the cap so as to provide adequate stability for the cap material and so as to localize any elastic movement of said material to portions thereof in driving contact with the quill seats.

It has previously been proposed to provide rubber or other yieldable bushings in bobbins for top drive contact (taper fitted) with steel spindles; but that proposal for several reasons is not a satisfactory solution to the problem of spindle tip wear, at least in the operation of filling spindles. First the bushings, if used in filling quills would so greatly increase the complexity of the quills as to make them impracticable from the standpoint of cost since filling quills are considered economically dispensable items. Second the bushings (particularly if designed to be mounted inside filling spindles which has never been actually practiced so far as I know) would defy inspection for accumulations of foreign matter thereon likely to cut and deform the steel spindle blade tips. Additionally, the bushings themselves notwithstanding lack of hardness as compared to steel would wear away the steel surface just as wood, a relatively soft material, wears and mars the steel tip when in intermittent high frequency contact therewith.

The present invention as preferably practiced provides sufficiently extensive association with the conventional straight cylindrical counterbore below the seat surfaces of the quill, so that (by design of the counterbore diameter in reference to a cylindrical skirt portion of the present elastic cap with adequately close clearance) an already known braking or dragging operation opposing "climb" or lifting of the quill under high speed operation (assuming proper donning) can be made much more effective than in the prior art because of the much higher frictional coefficient between the rubber or elastomer of the present spindle cap than exists between a metal spindle tip and wood or other materials suitable for making filling bobbins or quills. Many tests of the present rubber or elastomer filling spindle cap as shown herewith have demonstrated that regardless of how nearly mated a conical seat in the quill is to the illustrated tapered seat on the present rubber or elastomer spindle cap, doffing requires only a small force. The quill never sticks or wedges on the spindle and that is evidently due to the ability of the rubber or elastomer to be displaced elastically, e.g. become of less diameter than the associated quill seat surfaces. If the quill seat fails to conform approximately with that of the elastic spindle tip seat then doffing requires even less applied force; and driving of quills formed with an abrupt shoulder (for approximate "line" contact) is greatly improved as compared to approximate "line" contact of wood and other comparably inelastic quill seat surfaces with a steel spindle blade tip.

An additional feature of the present invention, by reason of so making the elastic cap that it can be designed to turn relative to its steel support, is that likelihood of seizure of the quills by the rapidly rotating spindle before the quills are properly seated thereon is greatly reduced. The above discussion indicates the more important objects of the invention.

Other objects and features of the invention will become apparent from the following description of the preferred form or, as illustrated herewith. The essential characteristics are summarized in the claims.

Figure 2:
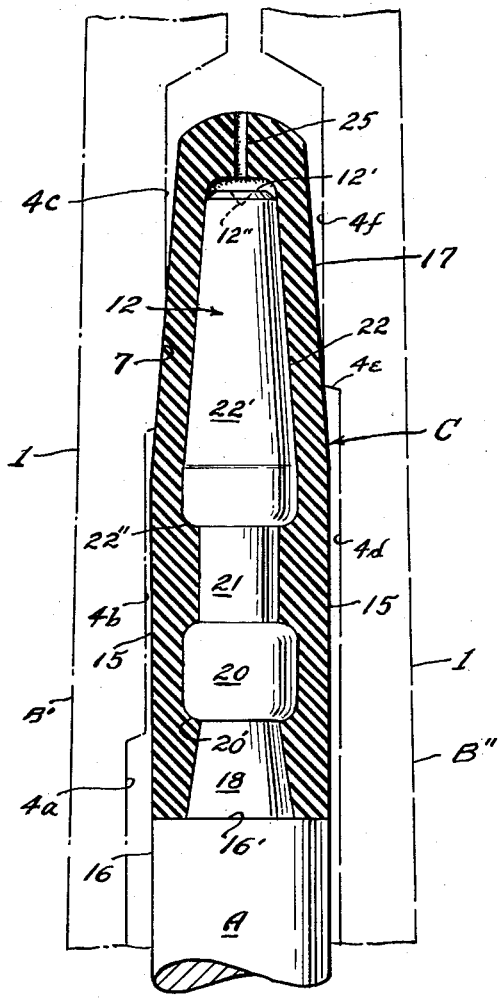

In the drawing, Fig. 1 shows, in full scale, a whorl and upper portion of a typical filling spindle blade A including the rubber or elastomer cap or tip C hereof and, in axial central section, a typical filling quill B in place on the cap or tip C. Fig. 2 is a greatly enlarged scale central sectional, partly diagrammatic, view of the cap or tip C and associated portions of the blade A as those portions are modified to receive and support the cap or tip C.

The filling quill B as shown in Fig. 1 has the usual externally tapered tubular body portion 1; enlarged cylindrical butt or base portion 2, counterbored at 6, and customary metal rings 3 for cooperation with the filling shuttle elements, not shown. The main or longer axial cylindrical bore 4 of the quill contains the usual bushing 5 to reenforce or protect the bore surface at its lower end. Counterbore 6 (around acorn portion W' of whorl W); the interior of bushing 5, and the principal portion of bore 4 are formed to have sufficient lateral clearance with the associated portions of the spindle blade so as normally to be out of contact therewith at all times. Supporting seat surface 7 of the quill B, as shown in Fig. 1 for contact with the spindle blade, is a frusto-conical or upwardly tapered portion of the bore 4. Thereabove the quill has the usual small axial vent hole 8.

At the left in Fig. 2, in dot and dash lines, the interior bore surfaces of the main body 1 of the quill B' are represented as three separate relatively stepped bore surface portions 4a, 4b and 4c. The conical seat surface 7 connects portions 4b and 4c and represents a typical taper for conformance fit with the seat surface of the spindle blade. At the right, in Fig. 2, the broken lines B" show a typical quill bore construction including bore portions 4d, 4e and 4f, relatively arranged for approximate ring line contact of the quill seat with the spindle blade seat. Bore surface 4d (right, Fig. 2) is shown as having typical or conventional clearance with associated surface portions of the spindle blade A. Smaller clearance (left, Fig. 2) between surfaces 4b and the adjacent cylindrical surface portion 15 of the rubber or elastomer cap C of the spindle blade is such that if the quill rises off its seat on the cap C (or if donning of the quill does not produce proper frictional driving contact at conical surface 7), normally adequate frictional drive will be afforded by contact of the quill surface 4b with the elastic cylindrical surface portion 15 of the cap C. Thus the tendency for the quill to continue upward movement under vibrational influence is lessened by the relatively high friction coefficient between the involved materials as already discussed. Surfaces 4d and 4e (right, Fig. 2) of the quill are shown as arranged for approximate ring line contact driving of the quill. Cylindrical surface 4d can, of course, be disposed closer to the associated surface 15 of the elastic cap C than as illustrated, so as to have rise-restraining frictional contact with the cap surface 15.

The preferred construction of cap C and of the upper or specially formed spud or stem portion 12 of the steel spindle blade A is as shown in Fig. 2, the design of spud and the interior of cap C being such as to facilitate application of the cap to the blade and detachment and replacement of the cap when or if necessary. The spud or stem 12 is of reduced diameter relative to the main cylindrical surface 16 of the spindle blade for the entire length of the spud. The base or neck portion 18 of the spud which is integral with the blade generally, is tapered or converges upwardly from flat surface 16' of the blade to a first relatively enlarged head or locking rib portion 20 of the spud. Therebeyond is a reduced neck 21 and beyond that neck a relatively enlarged generally conical second locking head 22 whose conical surface portion 22' has approximately the same taper as the seating surface 17 of the cap C. The rounded shoulders 20' and 22" on the respective head or rib portions of the spud or stem facilitate moulding of the elastic cap C and also facilitate removal of the cap for replacement if and when necessary. Other shoulder surfaces of the head portions of the spud are preferably rounded or as illustrated. All portions of the spud 12 are of circular cross section. The wall of the cap C at its tapered or seat surface 17 is preferably of uniform thickness and, incidentally, in the filling spindle construction shown the wall at that region is about 1/16 of an inch thick.

To facilitate application of the cap C to the spud portion 12 of the blade as well as to facilitate removal of the cap therefrom when necessary, the cap has an air vent hole 25 in its top portion.

When the seating surface 17 or other externally exposed surfaces of the cap are specially finished other than by the moulding process, such finish can be effectually done by grinding, thus removing any irregularities the moulded cap may have. If grinding is practiced, then the conical top portion 22 of the spud preferably extends entirely through the top of the elastic cap C (not so shown) thus to expose its top surface 12' and a centering socket 12". Suitable material for the cap C is elastomer (synthetic rubber) having from 60 to 70 durometer hardness and selected especially for toughness or tear resistance.

In the usual practice of making filling spindle blades entirely of metal and the quills of hard wood, the main bores corresponding to 4 Fig. 1 of the quills are apt to be made undersize or sufficiently rough so that when the quills are donned they tend to seize the rapidly rotating blade and start turning before the conical seat surfaces are in mutual contact. The present construction tends to safeguard the quills against seizure because preferably all the complementary surfaces of the spud portion 12 of the blade and of the elastic cap C are smooth and circular and are designed with only sufficient snugness to insure normal turning of a fully loaded quill. Thus, in event seizure tends to occur, the elastic cap can turn relative to the blade stem or spud, or in other words be arrested temporarily while the quill is being fully seated on the spindle.

In order to avoid the presence of a fissure or crack between the resilient cap C and axial shoulder surface such as 16', Fig. 2, the base portion or region of the cap C can be so designed in relation to its retaining surface or surfaces (e.g. shoulders 20' and 22") that when the lower surface of the cap C is brought against the surface 16' it exerts pressure thereon elastically. Whatever pressure is so exerted should not be such as to expand the diameter of the lower or skirt portion of the cap C into overhanging relation to the upper cylindrical surface 16. The surfaces 15 and 16, Fig. 2, of the cap and blade respectively should always be smooth and flush with each other.

It will be evident that the cap C can be cemented or bonded to the spindle spud 12 the shape of which would then be appropriately modified. Such practice is not recommended because of the advantages of ready removability of the preferred and illustrated form of cap and blade from each other and the above explained advantage of freedom of the cap C to turn at times relative to the steel portion of the blade.

I claim:

1. In a textile spindle for top drive of a bobbin at high speed, a steel blade of generally cylindrical form and having a relatively reduced diameter top end portion, and a tough elastic rubber or elastomer cap fitting said top end portion and having an exterior peripheral surface portion of circular cross section adapted for frictional driving contact with the interior of a bobbin or quill, the cap and top end portion of the blade being interlocked by opposed axial mating shoulder portions of said blade end portion and cap interiorly of the cap, and the elasticity of the cap material being such as to permit mounting of the cap endwise over said end portion to bring the shoulders into snug contact with each other.

2. The spindle according to claim 1, wherein the relatively reduced diameter portion of the blade has an annular enlargement between its axial limits snugly embraced by the elastic material of the cap, and, upwardly beyond the annular enlargement, the said portion is tapered or of gradually diminishing cross section upwardly and snugly embraced by the elastic material of the cap throughout the length of the tapered portion.

3. The spindle according to claim 1, wherein the mating portions of the cap and the relatively reduced diameter portion of the blade are smooth and of circular cross section throughout their length and otherwise so related that the blade can turn in the cap or relative thereto if, in donning of the bobbin or quill, seizure of the cap by the bobbin or quill tends to occur.

4. A top drive textile spindle having a steel blade of wholly circular cross section above its whorl portion, the upper end portion of the blade being of reduced diameter providing a stem having an upwardly tapered base portion, an enlargement thereabove providing a locking rib and a conical head above the rib tapering upwardly, and a rubber or elastomer bobbin or quill driving cap elastically fitting the stem for the full length of the stem and having a tapered external peripheral surface portion held in stable position coaxially of the spindle by snug contact with the conical head of the stem.

5. In combination with a tubular filling quill of wood or the like having an approximately non-yielding internal seating surface near its upper end, a steel spindle having a driving whorl and blade, the latter extending upwardly into the quill with sufficient clearance so as to be normally out of contact therewith below the seating surface, an upper end portion of the steel blade having a head portion radially opposite said seating surface and, therebelow, a reduced diameter portion defined in part by an axial, upwardly facing shoulder on the blade below the reduced diameter portion, and a tough rubber or elastomer cap having a relatively thick walled portion in snugly embracing relation to the reduced diameter portion of the blade, the thick walled portion having a lower surface in snug abutment with said axial shoulder, and the cap having a relatively thin walled portion in intimate peripheral contact with the head portion of the blade and being disposed for driving contact with the seating surface of the quill.

References Cited in the file of this patent

UNITED STATES PATENTS

| 284,429 | Jaquith | Sept. 4, 1883 |
| 2,236,178 | Kennedy | Mar. 25, 1941 |
| 2,497,834 | Kennedy | Feb. 14, 1950 |
| 2,773,346 | Childs et al. | Dec. 11, 1956 |